Figure 1:
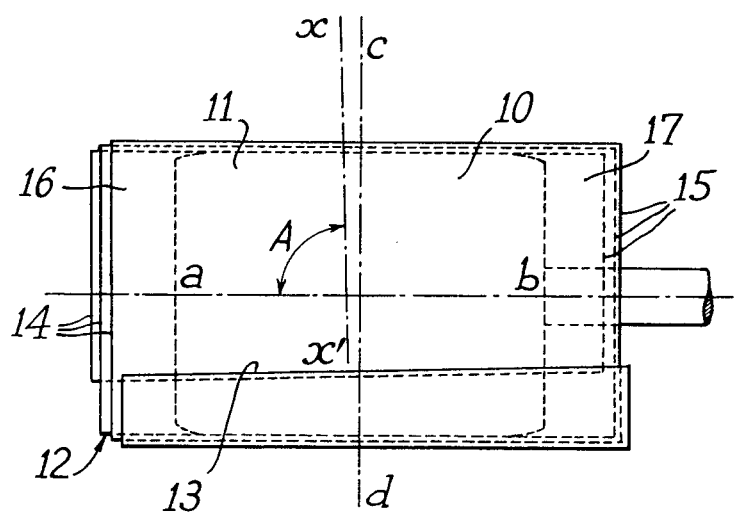

United States Patent

Delobelle

[11] 3,722,567
[45] Mar. 27, 1973

[54] RADIAL-PLY PNEUMATIC TIRE

[75] Inventor: Emile Jean Delobelle, (92) Colombes, France

[73] Assignee: Pneumatiques Caoutchouc Manufacture Et Plastiques Kleber-Colombes, Colombes, France

[22] Filed: Dec. 15, 1970

[21] Appl. No.: 98,360

Related U.S. Application Data

[62] Division of Ser. No. 702,031, Jan. 31, 1968, abandoned.

[52] U.S. Cl. ................................................152/354
[51] Int. Cl. ..................................................B60c 9/02
[58] Field of Search......................152/354, 355, 356

[56] References Cited

UNITED STATES PATENTS

| 2,628,652 | 2/1953 | Orr | 152/354 |
| 2,676,637 | 4/1954 | Frazier | 152/354 |

Primary Examiner—Gerald M. Forlenza
Assistant Examiner—Richard A. Bertsch
Attorney—Holcombe, Wetherill & Brisebois

[57] ABSTRACT

This invention relates to radial-ply tires having a reinforced breaker layer and a carcass that comprises a plurality of superimposed layers of cord fabric and the invention consists in helically winding a strip of carcass fabric of constant width and constituted of substantially transverse cords, on a cylindrical drum, thereby helically shifting the side edges of the strip and thus obtaining in the beads of the finished tire a staggering of the edges of the layers of carcass. In one embodiment, a first strip of carcass fabric of constant width is helically wound and the side parts of said strip are folded from the inside to the outside around the bead wires, whereafter a second helically wound strip of the fabric is superimposed on the first strip but the side parts of the second strip are folded from the outside to the inside around the bead wires. The edges are preferably helically displaced.

3 Claims, 5 Drawing Figures

RADIAL-PLY PNEUMATIC TIRE

This application is a divisional application from my co-pending application Ser. No. 702,031, now abandoned, filed Jan. 31, 1968.

In the manufacture of radial-ply tires, in which the carcass comprises a plurality of superimposed layers or "plies," the procedure adopted is as follows:

A first strip of carcass fabric known as "Cord" fabric (rubbered fabric formed of cords extending transversely at an angle of 90° with respect to the longitudinal direction of the strip) is wound in a complete revolution around a cylindrical tire-building drum, and the two ends of this strip are transversely secured, e.g. welded, sealed or spliced, to form a cylinder, then a second strip of fabric which is wound over the first, and so on until the number of layers or "plies" which will give the desired resistance to the carcass is built up.

Since, in the finished tire, it is desirable that the edges of the carcass plies be mutually displaced or staggered, either successive strips or groups of strips of different widths are usually wound on the drum, making their longitudinal axis coincide with the median plane of the drum, or alternatively, the successive strips are axially displaced with respect to the median plane of the drum. In large tires comprising a large number of carcass plies, these two methods are sometimes used in conjunction. A first group of carcass plies, referred to as an endless band or "complete group," is formed of a plurality of strips of the same width wound cylindrically or mutually axially displaced. Then one or more other similar endless bands or "complete groups" each formed from a strip of different widths are superimposed on the first endless band or "complete group."

This method requires that the tire-building machine be fed with a plurality of strips of carcass fabric of different widths, this complicating manufacture and the operations made before the actual making of the tires. In addition, the distributor members serving each tire-building machine must be provided with a number of unwinding stations large enough for storing the strips of fabric of different widths, or it is necessary to provide on these distributors lateral displacement means in order to permit different displacements of the strips with respect to the median plane of the tire-building machine. This leads to the use of complicated, cumbersome and costly distributors.

Thus, the invention firstly has for an object the provisional of radial-ply tires employing a reduced number of strips of carcass fabric of different widths whereby the preparation and manipulations of these strips as well as the distributors serving the tire-building machines can be simplified.

The invention consists, according to one aspect, in a radial-ply tire having a reinforcing breaker layer, a carcass which comprises a plurality of superimposed layers of cord fabric provided by a strip of cord fabric, of constant width and having cords extending transversely substantially at 90° with respect to the longitudinal axis of the strip, wound with successive turns of the strip positioned helically, the side edges of the carcass layers being thereby staggered, the tires having side walls and bead wires arranged in the lower part of each of the side walls and the staggered edges on each of the respective sides of the carcass layers being folded around the bead wires and terminating in a respective side wall.

According to another aspect the invention consists in a radial carcass belted tire including a plurality of superimposed carcass layers which consists of a single strip of substantially radial cord ply material helically wound upon itself and bead wires, the side parts of the said strip being folded around the bead wires with their edges helically staggered and situated in the lower part of the sidewalls of the tire.

In one embodiment of the invention which may be applied in particular to tires having a number of carcass layers, a first strip of carcass fabric of constant width is helically wound and the side parts of this strip are folded, from the inside to the outside, around the bead wires, then a second helically wound strip of carcass fabric is superimposed on the first and the side parts of this second strip are folded from the outside to the inside around the bead wires.

Figure 2:
Figure 3:
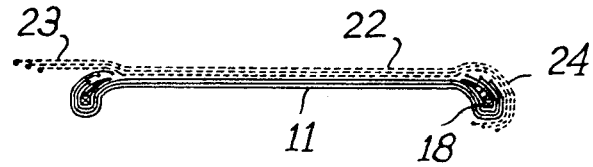
Figure 4:
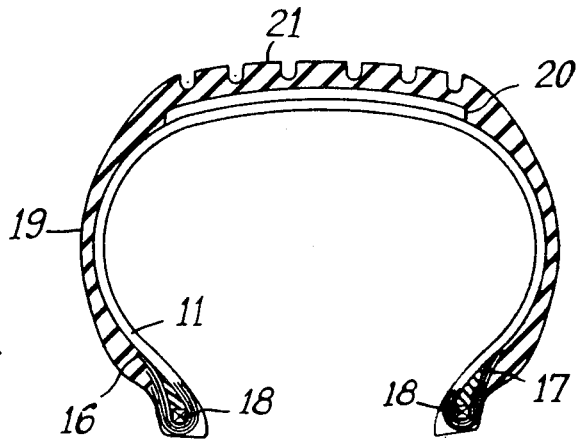
Figure 5:
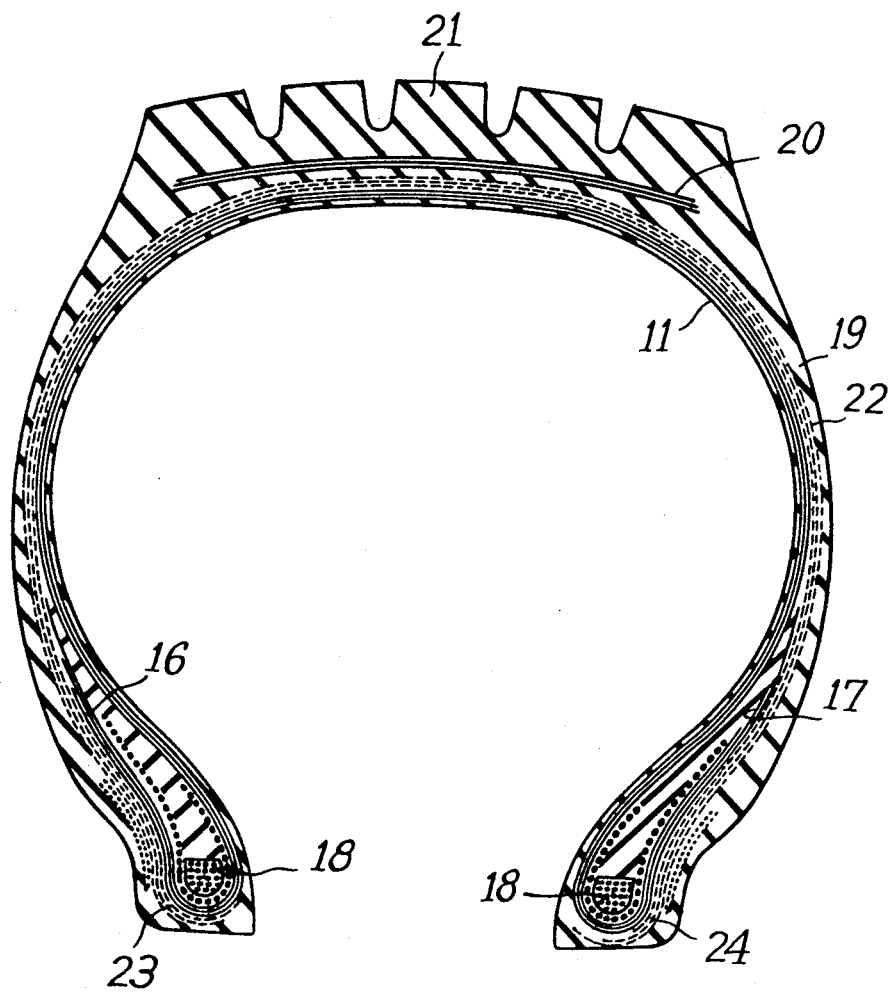

In order that the invention may be more clearly understood, reference will now be made to the accompanying drawings, which show certain embodiments thereof, by way of example, and in which:

FIG. 1 shows a schematic view of a tire building drum on which is helically wound a strip of carcass fabric, FIGS. 2 and 3 show schematic views illustrating certain phases of manufacture of tire carcasses, in cross-section, and FIGS. 4 and 5 show views in section of two examples of tires made according to the invention.

Referring now to FIGS. 1 and 2, in the manufacture of a radial-ply tire comprising, for example, three carcass layers or "plies," a strip of carcass fabric 11 constituted of transverse cords forming an angle of 90° with respect to the longitudinal axis $x-x'$ of the evolute strip is wound on a tire-making drum 10 which is generally cylindrical in shape. This strip is stored at an unwinding station of the distributor serving the tire-building machine. The winding of the strip 11 on the drum is initiated by presenting the end 12 of this strip so that the longitudinal axis $x-x'$ forms with respect to a generatrix $a\,b$ of the drum an angle A slightly less than 90°, for example 89° or 89° 30′. In addition, the axis, $x-x'$ is displaced slightly towards the left with respect to the median plane $c\,d$ of the drum. The drum 10 is then rotated in order to wind three complete revolutions of the strip and the strip is cut between two cords along the transverse edge 13. Thus, a helical winding of the strip 11 is obtained, the consequences being a helical displacement of the side edges 14 and 15. The side parts 16, 17 of the wound strip are then folded back as shown to the left of FIG. 2, the bead wires 18 are guided against these folded back parts, then the side parts 16, 17 are folded from the inside to the outside around the wires as shown in the right hand part of FIG. 2. The tire is then finished as usual by shaping the carcass, by positioning the side walls 19, the breaker layer reinforcement 20 and the tread 21 in order to obtain, after vulcanization in a mould, the tire shown in FIG. 4.

It is, therefore, seen that this method enables a carcass to be obtained by helically winding a single strip of fabric of constant width, having a plurality of layers with a displacement of the lateral edges 14 and 15 as is desirable for obtaining in the finished tire a displacement or staggering of the edges of the folded parts of the carcass at the beads of the tire. The building of this carcass, therefore, requires only a single unwinding station on the distributor whilst it would previously have been necessary to provide either three stations for strips of different widths or means for laterally displacing the unwinding station in order to shift the edges 14, 15. The method also avoids having to cut the strip and to secure, e.g. seal or splice, its ends upon each revolution around the drum.

The finished tire produced according to this method itself presents interesting characteristics. As has just been said, its carcass does not have seals or splices transverse to each ply, which in themselves may create zones of lowest resistance when they are defective which may give out-of-balance effects to the finished tire when they are badly distributed over the circumference of the carcass.

On the other hand, the side edges 14, 15 which are helically displaced when the carcass of the tire is on the drum 10, are, in the shaped and moulded tire, arranged spirally with respect to the axis of rotation of the tire. The stepping of the edges 14, 15 and their spiral shape is particularly favorable for obtaining a good resistance to separation and to any tendency to separation, which may be produced during use of the tire, due to repeated flexions of the side walls.

In the finished tire, shown in FIG. 4, the staggered edges 14, 15 of the carcass have been shown as stopping in the lower part of the side walls of the tire, this being the most current and most advantageous arrangement. However, it will be apparent that the height of the edges 14, 15 of the folded parts of the carcass may be modified by using at the beginning a strip of carcass fabric 11 which is wider or narrower.

The invention may also be applied to the manufacture of tires, the carcass of which comprises a plurality of groups of plies, some folded from the inside to the outside, and others from the outside to the inside, around the wires of the beads. FIGS. 3 and 5 illustrate this application.

In this latter application, after having produced a first group of three carcass plies, i.e. an endless band or a "complete group," by winding a single strip 11 of constant width as in FIGS. 1 and 2, and after having folded from the inside to the outside the side parts 16, 17 around the wires 18, another strip 22 may, for example, be helically wound in three revolutions in order to form another endless band or a "complete group." The side parts 23, 24 of this strip are then folded back from the outside to the inside around the wires 18 as shown in the right hand part of FIG. 3. The finished tire obtained according to this method is shown in FIG. 5. In tires of this type, it is preferable to use one strip 11 of width clearly greater than the meridian width of the carcass between the wires 18 in order that the side parts 16, 17 stop, in the finished tire, in the part of the side walls between the tire and the middle of the wall. On the other hand, use will preferably be made of a strip 22 of narrow width in order that the staggered edges of this strip stop below the wire of the beads.

I claim:

1. A radial-ply tire having a reinforcing breaker layer, and a carcass which comprises a plurality of superimposed layers of cord fabric provided by a strip of cord fabric, of constant width and having cords extending transversely substantially at 90° with respect to the longitudinal axis of the strip, wound with successive turns of the strip positioned helically, the side edges of the carcass layers being thereby staggered, the tires having side walls and bead wires arranged in the lower part of each of the side walls and the staggered edges on each of the respective sides of the carcass layers being folded around the bead wires and terminating within a respective side wall.

2. A radial-ply tire according to claim 1 having the staggered edges of the carcass layers folded around the respective bead wires from the inside to the outside of the tire, a second strip of cord fabric superimposed upon the first mentioned strip and wound with successive turns of the second strip positioned helically, the side edges of the second strip being thereby staggered and being folded around the bead wires from the outside to the inside of the tire wherein the first mentioned strip has a width greater than the meridian width between the bead wires of the tire, and its side edges are situated in the part of the respective side walls of the tire between the middle of the side walls and the bead wires.

3. A tire according to claim 2 wherein the second strip has such a width and is so arranged that the staggered side edges are terminated within the side walls of the tires at a radial distance from the axis less than that of the respective bead wires.

* * * * *